June 6, 1972 W. W. WOOD 3,667,838
UPDATABLE FILM APPARATUS FOR A MICROFILM RETRIEVAL SYSTEM
Filed Nov. 17, 1969 2 Sheets-Sheet 1

INVENTOR
WILLIAM WADSWORTH WOOD
BY
Daniel Jay Dick
ATTORNEY

INVENTOR.
WILLIAM WADSWORTH WOOD
BY Daniel Jay Tick
ATTORNEY

United States Patent Office 3,667,838
Patented June 6, 1972

3,667,838
UPDATABLE FILM APPARATUS FOR A
MICROFILM RETRIEVAL SYSTEM
William Wadsworth Wood, 235 Peruvian Ave.,
Palm Beach, Fla. 33480
Filed Nov. 17, 1969, Ser. No. 877,266
Int. Cl. G03b 23/12
U.S. Cl. 353—26      3 Claims

ABSTRACT OF THE DISCLOSURE

A plurality of reels coaxially positioned in adjacent relation are driven in synchronism with each other. Each of a plurality of strips of film is wound on a separate one of the reels so that any of the reels may be removed for updating without preventing the driving of the remainder of the reels.

DESCRIPTION OF THE INVENTION

The present invention relates to updatable film apparatus. More particularly, the invention relates to updatable film apparatus for a microfilm retrieval system.

A microfilm retrieval system of the type utilizing the updatable film apparatus of the present invention is disclosed in copending patent application Ser. No. 720,002, filed Apr. 9, 1968 by William Wadsworth Wood for "Picture Computer."

It is extremely difficult, if not impossible, to update microfilm without preventing the complete termination of operation of the microfilm retrieval system for a specific period of time. The period of time during which the microfilm retrieval system is inoperative is determined, of course, by the time required to update the microfilm. The necessity for updating thus creates a serious problem when the data, information or images, or the like, recorded on the microfilm require constant updating. The problems involved with updating and some solutions therefor are disclosed in the aforedescribed copending patent application.

The principal object of the present invention is to provide new and improved updatable film apparatus.

An object of the present invention is to provide new and improved updatable film apparatus in a microfilm retrieval system.

An object of the present invention is to provide updatable film apparatus which permits the updating of film without disrupting the operation of a microfilm retrieval system utilizing such updatable film apparatus.

An object of the present invention is to provide updatable film apparatus which permits rapid and facile accessibility to any desired area of a microfilm strip for updating operations in such desired area without disruption of operation of a microfilm retrieval system utilizing such microfilm strip.

An object of the present invention is to provide updatable film apparatus which is effective, efficient and reliable in operation and which is economical in production and operation.

In accordance with the present invention, updatable film apparatus comprises a plurality of reels coaxially positioned in adjacent relation. Driving means drives each of the reels in synchronism with the others. Each of a plurality of strips of film is wound on a separate one of the reels whereby any of the reels may be removed for updating without preventing the driving of the remainder of the reels. Each of the reels has an axis and a pair of spaced flange members extending perpendicularly to the axis and parallel to each other. Each of the flange members has a plurality of spaced ears extending radially therefrom. The ears extending from each of the flange members of each of the reels are equidistantly spaced from each other. Four ears are provided on each of the flange members of each of the reels and the ears extend substantially coplanarly with the corresponding flange members.

In accordance with the present invention, updatable film apparatus comprises a first plurality of reels coaxially positioned in adjacent relation. A second plurality of reels coaxially positioned in adjacent relation is spaced from and axially parallel to the first plurality of reels. Driving means drives each of the reels of each of the first and second groups of reels in synchronism with the others. The driving means is adapted to drive the groups of reels in opposite directions. Each of a plurality of strips of film is wound on a separate corresponding one of the reels of each of the first and second groups of reels whereby any of the reels of one of the groups of reels and the corresponding reels of the other of the groups of reels may be removed for updating without preventing the driving of the remainder of the reels.

Each of the reels of each of the first and second groups of reels has an axis and a pair of spaced flange members extending perpendicularly to the axis and parallel to each other. Each of the flange members has a plurality of spaced ears extending radially therefrom. The ears extending from each of the flange members of each of the reels are equidistantly spaced from each other. Four ears are provided on each of the flange members of each of the reels and the ears extend substantially coplanarly with the corresponding flange members.

In accordance with the present invention, a microfilm retrieval system comprises image projecting apparatus. A first plurality of reels are coaxially positioned in adjacent relation in opposite proximity with the projecting apparatus on one side thereof. A second plurality of reels are coaxially positioned in adjacent relation in operative proximity with the projecting apparatus on the other side thereof. The second plurality of reels is spaced from and axially parallel to the first plurality of reels. Elevating means mounting the first and second plurality of reels selectively raises and lowers the first and second plurality of reels relative to the projecting apparatus. Driving means drives each of the reels of each of the first and second groups of reels in synchronism with the others. The driving means is adapted to drive the groups of reels in opposite directions. Each of a plurality of strips of film has a plurality of microfilm images recorded thereon and each is wound on a separate corresponding one of the reels of each of the first and second groups of reels whereby any of the reels of one of the groups of reels and the corresponding reel of the other of the groups of reels may be removed for updating without preventing the driving of the remainder of the reels. Control means positioned in operative proximity with the strips of film and connected to the driving means and the elevating means controls the operation of the driving means and the elevating means in accordance with selected X, Y coordinates of the strips of film.

Each of the reels of each of the first and second groups of reels has an axis and a pair of spaced flange members extending perpendicularly to the axis and parallel to each other. Each of the flange members has a plurality of spaced ears extending radially therefrom. The ears extending from each of the flange members of each of the reels are equidistantly spaced from each other and extend substantially coplanarly with the corresponding flange members.

In order that the present invention may be readily carried into effect, it will now be described with reference to the accompanying drawings, wherein.

In the figures, the same components are identified by the same reference numerals.

Figure 1:
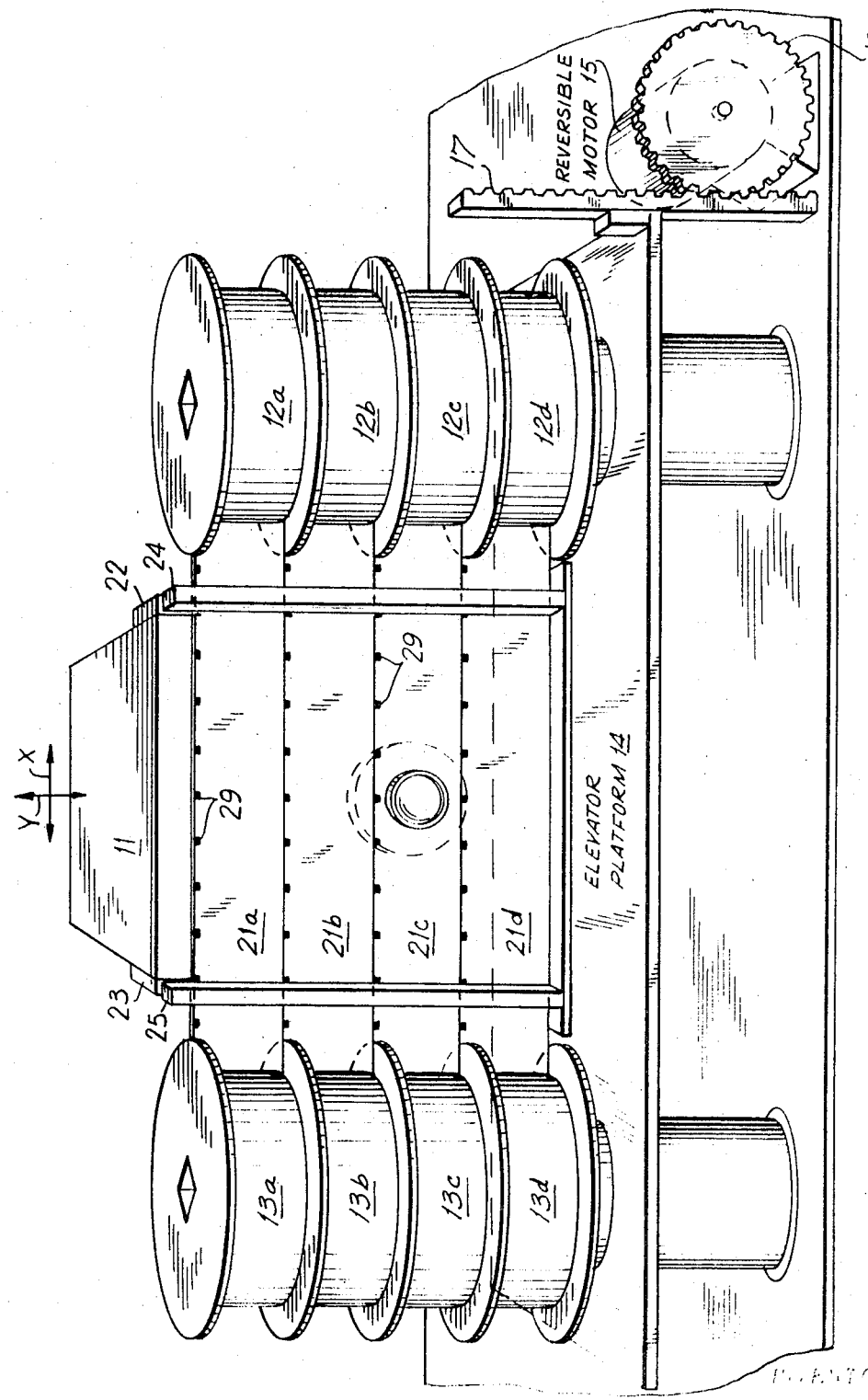
FIG. 1 is a perspective view of part of a microfilm retrieval system utilizing the updatable film apparatus of the present invention.

In FIG. 1, image projecting apparatus 11 comprises any suitable known type of projecting apparatus for projecting an image recorded on film. Suitable projecting apparatus is illustrated in, and described in connection with FIGS. 3, 39, 55 and 56 of the aforedescribed copending patent application. A first plurality of reels 12a, 12b, 12c and 12d are coaxially positioned in adjacent relation to each other in operative proximity with the projecting apparatus 11. A second plurality of reels 13a, 13b, 13c and 13d are coaxially positioned in adjacent relation with each other in operative proximity with the projecting apparatus 11.

The first plurality of reels 12a to 12d and the second plurality of reels 13a to 13d are positioned on opposite sides of the projecting apparatus 11 and in operative proximity with said projecting apparatus. The first and second plurality of reels 12a to 12d and 13a to 13d are spaced from and axially parallel to each other.

The first and second plurality of reels 12a to 12d and 13a to 13d are mounted on an elevator platform 14. The elevator platform 14 is selectively raised and lowered, thereby selectively raising and lowering the first and second plurality of reels 12a to 12d and 13a to 13d, relative to the projecting apparatus 11, by a motor 15. The motor 15 is a reversible electric motor and is mechanically coupled to the elevator platform 14 via a suitable gear coupling 16, 17. The reversible motor 15 thus raises the elevator platform and the first and second groups of reels 12a to 12d and 13a to 13d when it is rotated in one direction and lowers said elevator platform and said groups of reels when it is rotated in the opposite direction.

Figure 2:
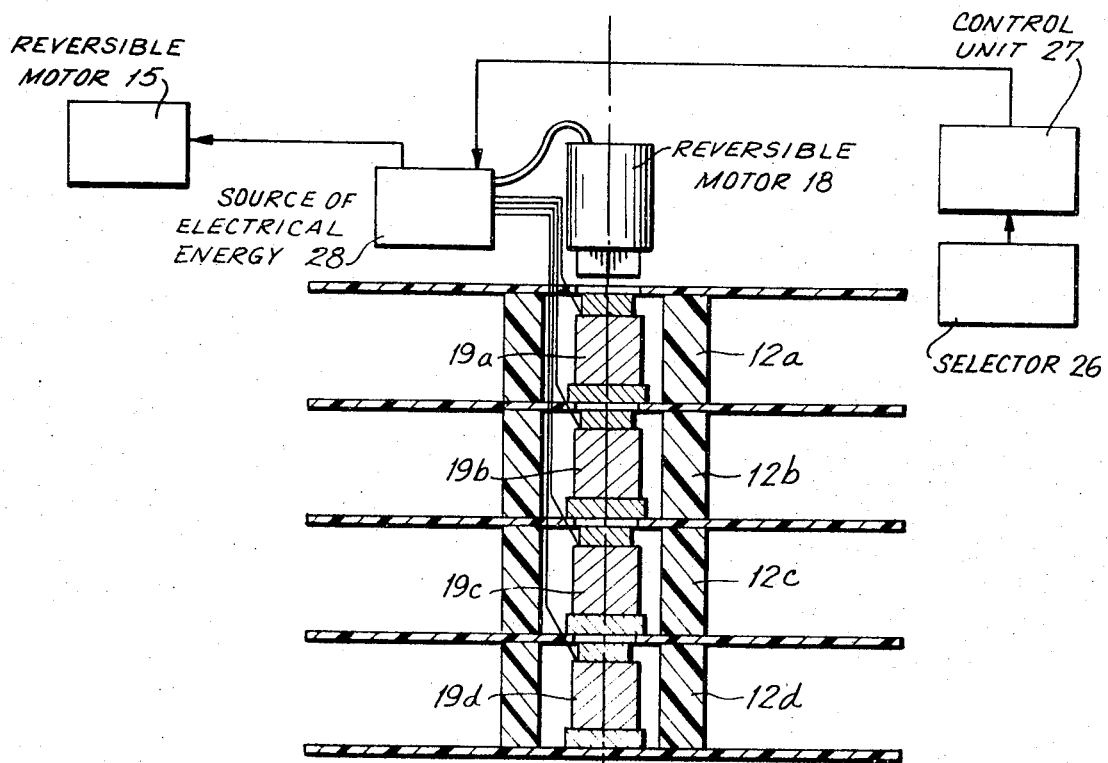
FIG. 2 is a combined block diagram and sectional view illustrating an embodiment of the driving means for driving the updatable film apparatus of the present invention.

A drive motor is provided for each of the first and second groups of reels 12a to 12d and 13a to 13d, although only one of said drive motors 18 is illustrated in FIG. 2, in conjunction with the first group of reels 12a to 12d. The drive motors for each of the groups of reels are identical to each other. The drive motor 18 is a reversible electric motor and is adapted to drive each of the reels 12a to 12d via a square shaped aperture formed in each of said reels around the axis thereof.

The reels 12a to 12d, and the reels 13a to 13d which are operated identically, are driven via magnetic clutches 19a, 19b, 19c and 19d, respectively, as shown in FIG. 2. The energization of the magnetic clutches 19a to 19d, as well as the magnetization of the magnetic clutches of the reels 13a to 13d, not shown in the figures, and the energization of the reversible motor 18 and the reversible motor 15 are hereinafter described in detail. The drive motors for the first and second groups of reels 12a to 12d and 13a to 13d drive said groups of reels in opposite directions, as desired.

As shown in FIG. 1, a plurality of strips of film 21a, 21b, 21c and 21d are provided. Each of the strips of film 21a to 21d has a plurality of microfilm images recorded thereon and each is wound on a separate corresponding one of the reels of each of the first and second groups of reels 12a to 12d and 13a to 13d. The strip of films 21a is thus wound on the first reel 12a of the first group of reels and on the first reel 13a of the second group of reels, and so on.

The winding of the microfilm in a plurality of strips on a plurality of reels facilitates the rapid and facile removal of any of the reels of one of the groups of reels and the corresponding reel of the other of the groups of reels for updating without preventing the driving of the remainder of the reels. Thus, if it is desired to update any of the strips of film 21a to 21d, it is only necessary to remove the two reels on which the selected strip of film is wound. The other reels are rapidly replaced in position and the retrieval system continues to operate with the remaining reels. The only delay necessitated is that required to remove the reels on which the film strip to be updated is wound. This delay is infinitesimally small compared to the delay required in known systems for updating of the film, since in such known systems, the operation must be halted for the entire period required for such updating.

After the strip of film 21a, 21b, 21c or 21d to be updated, has been removed from the retrieval system, it is updated in any suitable manner. A suitable method for updating or splicing of sections of film may comprise any one of those illustrated in, and described in connection with FIGS. 23, 24, 25 and 26 of the aforedescribed copending patent application.

A pair of banks of photocells 22 and 23 are provided, one of each side of the projecting apparatus 11. A bank of lights 24 is positioned in operative proximity with the bank of photocells 22 and a bank of lights 25 is positioned in operative proximity with the bank of photocells 23. The film strips 21a to 21d pass between the bank of photocells 22 and the bank of lights 24 and the bank of photocells 23 and the bank of lights 25. The banks of photocells and lights function in a known manner, and as described in connection with FIGS. 4, 5, 10, 11, 16, 17, 18 and 19 of the aforedescribed copending patent application, to determine the X and Y coordinates of the position of the film at each instant.

In operating the microfilm retrieval system, part of which is shown in FIG. 1, the user operates a selector 26 (FIG. 2) of any suitable type such as, for example, that shown in FIGS. 1, 2, 8, 41, 42, 43, 44 and 45 of the aforedescribed copending patent application, to select a desired image recorded on one of the film strips 21a to 21d (FIG. 1). The selector 26 functions in conjunction with a control unit 27 to select the desired image in accordance with the selected X, Y coordinates thereof. The control unit may comprise any suitable arrangement for detecting the X, Y position of the strips of film 21a to 21d at any instant, as described in the aforedescribed copending patent application.

In the embodiment of the system illustrated in FIG. 1, the control unit 27 comprises the banks 22 and 23 of photocells and the banks 24 and 25 of lamps or lights. The banks of lights and photocells activate a source 28 of electrical energy, as shown in FIG. 2, in accordance with the coordinates selected in the selector 26. Thus, the source of electrical energy 28 energizes the reversible motor 15 to move the first and second groups of reels 12a to 12d and 13a to 13d up and down until the banks of photocells 22 and 23 indicate that the selected Y coordinate has been determined in the retrieval system. The reversible motor 15 is then deenergized and the source of electrical energy 28 energizes the reversible motor 18 and the magnetic couplings 19a to 19d. The source of electrical energy 28 then energizes the reversible motor 18 alternately in opposite directions until the X coordinate selected in the selector 26 is determined. When the banks of photocells 22 and 23 indicate that the appropriate X, Y coordinates have been located and positioned in projecting position, as described in the aforedescribed copending patent application, the selected images are projected on a screen, not shown in the figures.

In order to enable the detection of the X, Y coordinates of the positions of the film strips 21a to 21d, each of said film strips is suitably marked by any suitable means, as described in conjunction with, and illustrated in, FIGS. 4, 5, 10 and 11 of the aforedescribed copending patent application. The position of the film may thus be suitably determined by black marks 29 (FIG. 1) along one edge each strip.

Figure 3:
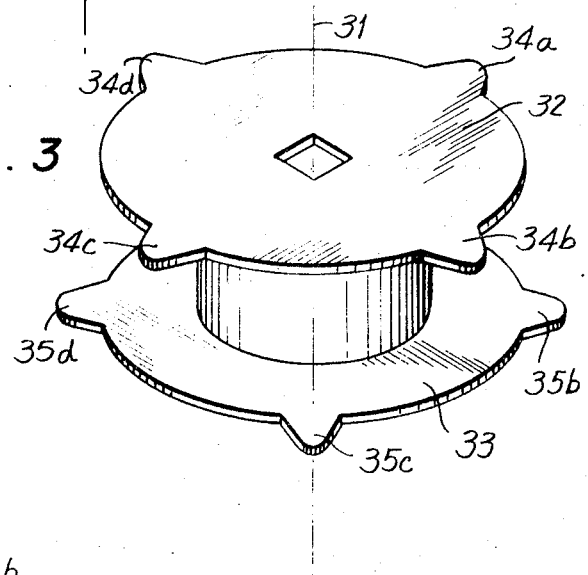
FIG. 3 is a perspective view of a modified reel of the updatable film apparatus of the present invention.
Figure 4:
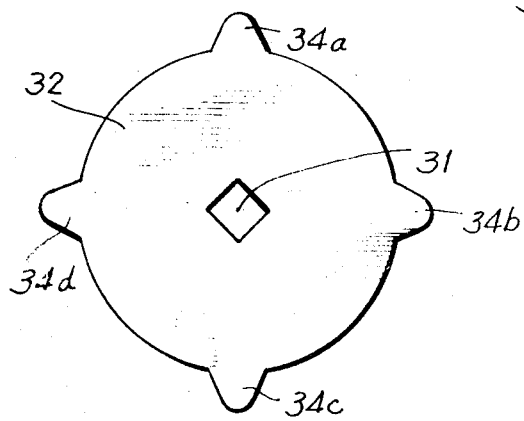
FIG. 4 is a top view of the reel of FIG. 3.

FIGS. 3 and 4 illustrate a modification of the reel of which a plurality comprise the first group of reels 12a to 12d and of which another plurality comprise the second group of reels 13a to 13d, as shown in FIG. 1. In the modification of FIGS. 3 and 4, the reel is shown to have an axis 31 and a pair of spaced flange members 32 and 33 of the usual type, extending perpendicularly to said axis and parallel to each other.

In accordance with the present invention, however, each of the flange members 32 and 33 has a plurality of spaced ears 34a, 34b, 34c and 34d, and 35a (not shown in the figures), 35b, 35c and 35d extending radially therefrom. The ears 34a to 34d extending radially from the flange member 32 are equidistantly spaced from each other and extend substantially coplanarly with said flange member. The ears 35a to 35d extending from the flange member 33 are equidistantly spaced from each other and extend substantially coplanarly with said flange member.

Although, in the embodiment of FIGS. 3 and 4, illustrated in the present invention, four ears are shown for each flange, any suitable number of such ears may be utilized. Furthermore, the ears of the pair of flanges 32 and 33 may either be aligned in directions parallel to the axis 31 or may be out of alignment in such directions, as desired. The purpose of the ears 34a to 34d and 35a to 35d is to increase the storage capacity of the reel and to enable one reel to be radially unwound and the other reel to take up all the film unwound from the first without difficulty. The ears 34a to 34d and 35a to 35d thus considerably enhance the capacity of each reel with a minimum expenditure of additional material, which material is that utilized for said ears.

While the invention has been described by means of a specific example and in a specific embodiment, I do not wish to be limited thereto, for obvious modifications will occur to those skilled in the art without departing from the spirit and scope of the invention.

What I claim is:
1. In a microfilm retrieval system,
image projecting apparatus;
a first plurality of reels coaxially positioned in adjacent relation in operative proximity with said projecting apparatus on one side thereof;
a second plurality of reels coaxially positioned in adjacent relation in operative proximity with said projecting apparatus on the other side thereof, said second plurality of reels being spaced from and axially parallel to said first plurality of reels;
elevating means mounting said first and second plurality of reels for selectively raising and lowering said first and second plurality of reels relative to said projecting apparatus;
driving means for driving each of the reels of each of said first and second groups of reels in synchronism with the others, said driving means being adapted to drive said groups of reels in opposite directions;
a plurality of strips of film each having a plurality of microfilm images recorded thereon and each wound on a separate corresponding one of the reels of each of said first and second groups of reels whereby any of the reels of one of said groups of reels and the corresponding reel of the other of said groups of reels may be removed for updating without preventing the driving of the remainder of said reels; and
control means positioned in operative proximity with said strips of film and connected to said driving means and said elevating means for controlling the operation of said driving means and said elevating means in accordance with selected X, Y coordinates of said strips of film.

2. In a microfilm retrieval system as claimed in claim 1, wherein each of the reels of each of said first and second groups of reels has an axis and a pair of spaced flange members extending perpendicularly to said axis and parallel to each other, each of said flange members having a plurality of spaced ears extending radially therefrom.

3. In a microfilm retrieval system as claimed in claim 2, wherein the ears extending from each of the flange members of each of said reels are equidistantly spaced from each other and extend substantially coplanarly with the corresponding flange members.

References Cited
UNITED STATES PATENTS

| | | | |
|---|---|---|---|
| 3,262,357 | 7/1966 | Warzynski et al. | 353—26 |
| 2,280,750 | 4/1942 | Emerson | 353—26 |
| 2,684,210 | 7/1954 | Conti | 242—56.9 |
| 3,033,480 | 5/1962 | Parzen | 242—180 |

WILLIAM D. MARTIN, Jr., Primary Examiner

U.S. Cl. X.R.

242—180